(12) United States Patent
Fior et al.

(10) Patent No.: US 8,926,025 B2
(45) Date of Patent: Jan. 6, 2015

(54) OVERMOLDING STEEL WHEEL

(75) Inventors: Andre Fior, Limeira (BR); Marcio Aparecido de Oliveira, Limeira (BR); Fernando T. Mitsuyassu, Limeira (BR)

(73) Assignee: Iochpe-Maxion S.A., Limeira—SP (BR)

( * ) Notice: Subject to any disclaimer, the term of this patent is extended or adjusted under 35 U.S.C. 154(b) by 262 days.

(21) Appl. No.: 12/705,774

(22) Filed: Feb. 15, 2010
(Under 37 CFR 1.47)

(65) Prior Publication Data

US 2011/0043029 A1    Feb. 24, 2011

Related U.S. Application Data

(60) Provisional application No. 61/156,554, filed on Mar. 2, 2009.

(51) Int. Cl.
*B60B 3/10* (2006.01)
*B60B 1/10* (2006.01)

(52) U.S. Cl.
CPC ....................... *B60B 1/10* (2013.01)
USPC .............. 301/35.59; 301/64.101; 29/894.341

(58) Field of Classification Search
USPC ............ 301/9.1, 10.1, 12.1–12.2, 14, 65, 68, 301/80, 84–85, 63.101, 63.103–63.105, 301/64.101–64.102, 64.202, 64.301, 301/64.305, 64.307, 64.704, 35.621, 35.59; 29/894.321, 894.341
See application file for complete search history.

(56) References Cited

U.S. PATENT DOCUMENTS

| | | | | |
|---|---|---|---|---|
| 1,504,090 A * | 8/1924 | Brodie | ........................... | 301/84 |
| 3,669,501 A * | 6/1972 | Derleth | ...................... | 301/37.42 |
| 3,874,055 A * | 4/1975 | Wilcox | .................... | 29/894.341 |
| 4,153,267 A * | 5/1979 | Hilber | ........................ | 280/281.1 |
| 4,173,374 A * | 11/1979 | Resele et al. | ................... | 301/6.3 |
| 5,031,966 A * | 7/1991 | Oakey | ........................ | 301/37.11 |
| 6,244,669 B1 * | 6/2001 | Braunschweiler | .............. | 301/84 |
| 6,439,671 B1 * | 8/2002 | Lehnhardt et al. | .............. | 301/84 |
| 7,681,958 B1 | 3/2010 | Bagdasarian | | |

FOREIGN PATENT DOCUMENTS

| | | |
|---|---|---|
| JP | 53-14821 U | 2/1978 |
| JP | 2008222226 A | 9/2008 |
| WO | 9965709 A1 | 12/1999 |

OTHER PUBLICATIONS

Chinese First Office Action, Application No. 201080011724.6 dated Jun. 27, 2014.

* cited by examiner

*Primary Examiner* — Jason Bellinger
(74) *Attorney, Agent, or Firm* — MacMillan, Sobanski & Todd, LLC

(57) ABSTRACT

A vehicle wheel includes a rim having an inner peripheral surface, and a center disc portion spaced radially inwardly from the inner peripheral surface. The center disc portion includes a body having a plurality of protruding portions separated from each other by curved recesses. The wheel further includes a plurality of structural arms with each structural arm having a first arm end attached to the inner peripheral surface of the rim at a first weld attachment interface and a second arm end received within one of the curved recesses of the body. Each of the second arm ends is attached to the center disc portion at a second weld attachment interface.

20 Claims, 10 Drawing Sheets

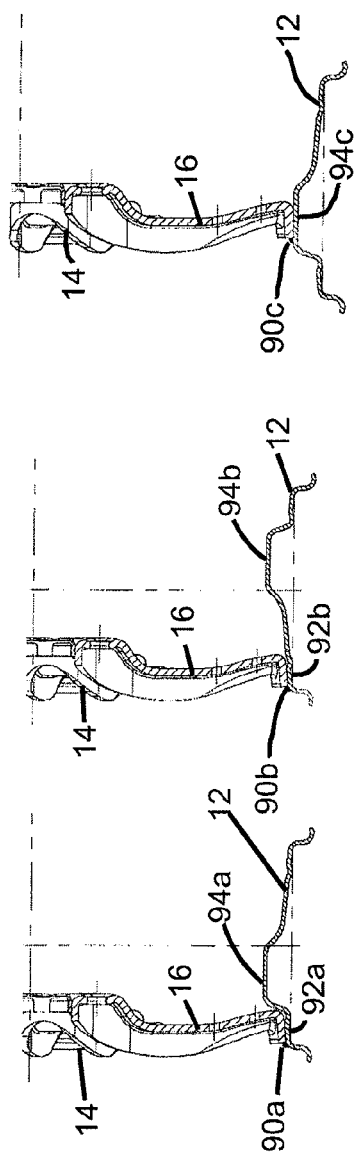
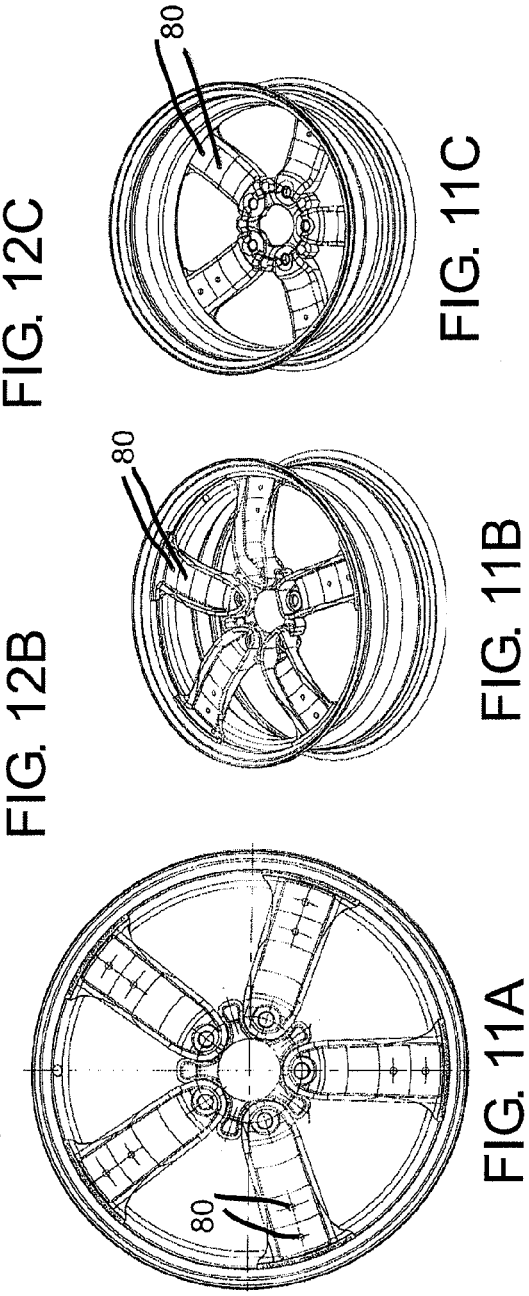

OVERMOLDING STEEL WHEEL

CROSS REFERENCE TO RELATED APPLICATIONS

This application is related to commonly owned copending Provisional Application Ser. No. 61/156,554, filed Mar. 2, 2009, incorporated herein by reference in its entirety, and claims the benefit of its earlier filing date under 35 U.S.C. 119(e).

BACKGROUND OF THE INVENTION

This invention generally relates to a wheel assembly that includes a steel rim, a center disc portion, and a plurality of discrete structural arms that attach the center disc portion to the rim. The invention further relates to overmolding a composite or plastic material on the wheel assembly to provide a desired appearance.

Traditional steel wheels have excellent resistance performance in terms of fatigue and impact. One disadvantage with these steel wheels is design flexibility from an appearance aspect as compared to what can be provided by aluminum wheels. In order to address this issue, steel wheels have utilized plastic covers, stainless steel clads, or composite clads to improve steel wheel appearance. These additional structures are disadvantageous from a weight and cost perspective.

BRIEF DESCRIPTION OF THE DRAWINGS

FIG. 11A is a side view of a wheel in accordance with an embodiment of the invention, having additional holes in the arms;

FIG. 11B is a perspective view of the wheel of FIG. 11A;

FIG. 11C is another perspective view of the wheel of FIG. 11A;

FIG. 12A shows a wheel having one type of bead-seat attachment, in accordance with an embodiment of the invention;

FIG. 12B shows a wheel having another type of bead-seat attachment, in accordance with another embodiment of the invention; and FIG. 12C shows a wheel having a still further type of bead-seat attachment, in accordance with a further embodiment of the invention.

DETAILED DESCRIPTION OF THE DRAWINGS

Figure 1:
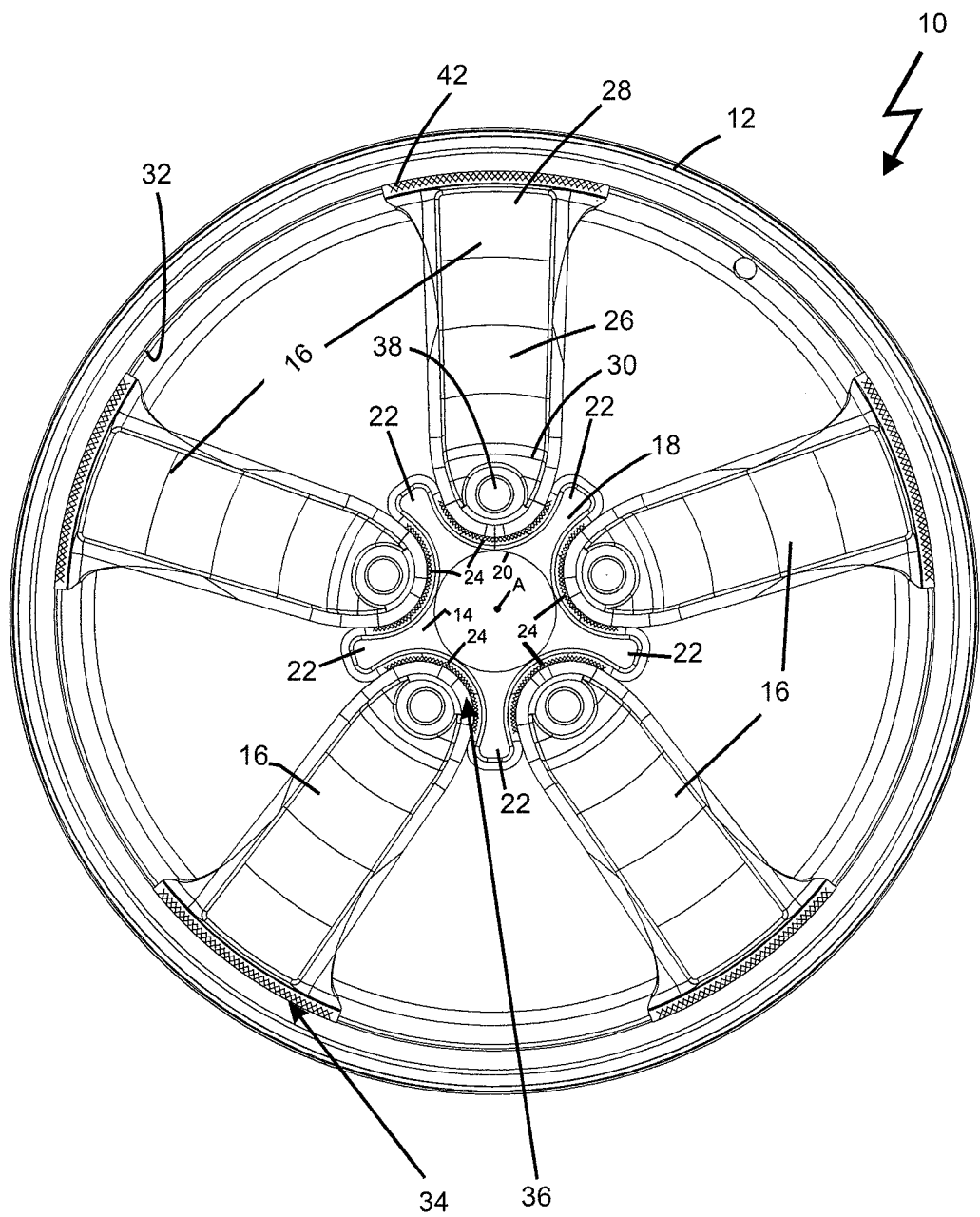
FIG. 1 is a side view of one side of a wheel in accordance with an embodiment of the invention.

A vehicle wheel 10 is shown in FIG. 1. The vehicle wheel 10 is rotatable about an axis A and includes a rim 12, a center disc portion 14, and a plurality of structural arms 16 that connect the center disc portion 14 to the rim 12. In one example, the rim 12 comprises a standard steel rim made by known methods. The center disc portion 14 can be made by any of various manufacturing processes. For example, the center disc portion 14 can be stamped, forged, hydro-formed, low pressure injection molded, etc. In one example, the center disc portion 14 is comprised of a stamped steel. The structural arms 16 are a plurality of discrete arms that can be made from any of various materials. In one example, the structural arms 16 are made from a steel material. The structural arms 16 are initially separate components from the rim 12 and center disc portion 14 and are subsequently attached to the rim 12 and center disc portion 14 to form the vehicle wheel 10.

Figures 9A, 9B, 9C, 9D:
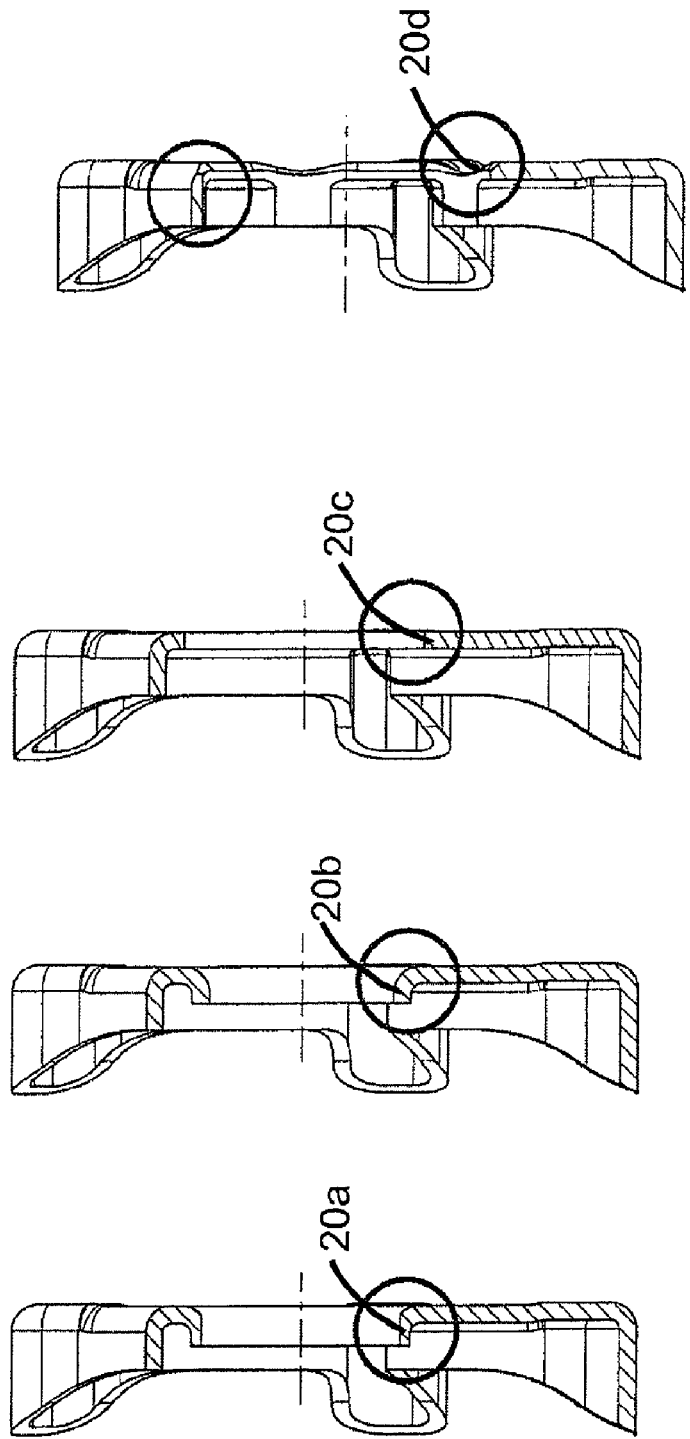
FIG. 9A shows a wheel having a flanged-machined pilot center bore.
FIG. 9B shows a wheel having a flanged pilot center bore.
FIG. 9C shows a wheel having a pierced pilot center bore.
FIG. 9D shows a wheel having a pierced pilot center bore that is then machined.
Figure 10C:
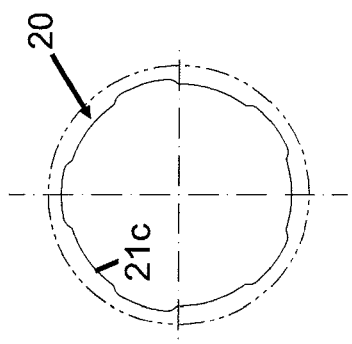
FIGS. 10A through 10D illustrate various shapes that the center aperture can have in accordance with various embodiments of the invention.
Figure 10B:
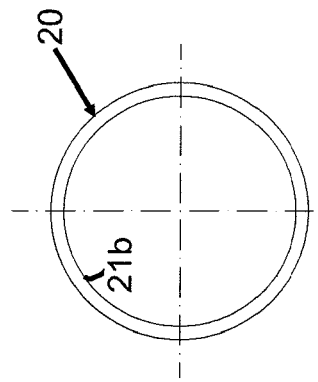
Figure 10D:
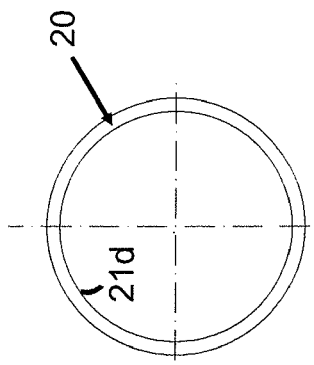
Figure 10A:
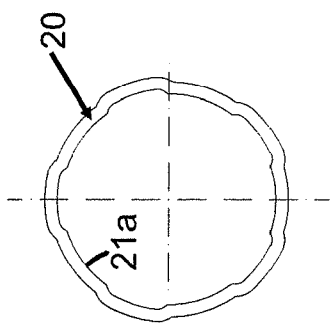

The center disc portion 14 includes a disc body 18 with a center aperture 20. The center aperture 20 provides centering of the wheel 10 onto a vehicle hub. The shape of the center aperture can vary to better fit a specified hub configuration (e.g., see FIGS. 9A-9D and 10A-10D). FIG. 9A shows a center bore or aperture 20a that comprises a flange-machined pilot bore. FIG. 9B shows a center aperture 20b that comprises a flanged pilot bore. FIG. 9C shows a center aperture 20c that comprises a pierced pilot bore. FIG. 9D shows a center aperture 20d that comprises a machined-after pierced pilot bore. FIGS. 10A-10D respectively show different shapes 21a, 21b, 21c, 21d that the center aperture 20 may take.

The disc body 18 includes a plurality of protruding portions 22, such as legs for example, that extend in a radial direction outwardly relative to the center aperture 20. Between each pair of protruding portions 22 is a curved recess 24. One structural arm 16 is received within each curved recess 24. As can be seen best in FIG. 5, the protruding portions 22 and the curved recesses 24 cooperate to define a disc body portion, indicated generally at 25A, that extends in a generally perpendicular direction relative to the axis X and which terminates at a single common peripheral side wall, indicated generally at 25B, which extends in a generally parallel direction relative to the axis. As a result, the peripheral side wall 25B extends continuously and circumferentially about the disc body portion 25A so as to provide the disc body portion 25A with a continuously extending peripheral side wall 25B and with a generally L-shape at a transition from the disc body portion 25A to the peripheral side wall 25B.

In the example shown, the center disc portion 14 includes five protruding portions 22; however, additional protruding portions or fewer protruding portions could be used depending upon the circle formed by fastener apertures 38 in the structural arms 16.

As shown, each structural arm 16 includes an arm body 26 that extends in the radial direction between a first arm end 28 and a second arm end 30. Each first arm end 28 is attached to an inner peripheral surface 32 of the rim 12 at a first joint attachment interface 34. Each second arm end 30 is attached to the center disc portion 14 at a second joint attachment interface 36. Depending on load requirements for this type of structural wheel 10, a third joint attachment interface 48 may also be required. The joint attachment interfaces could be accomplished through any of various joining processes. For example, these interfaces could be made by using MIG/Plasma welding, laser welding, hybrid-laser welding, MIG/MAG welding, mechanical attachments (rivets, fasteners, etc.), or chemical attachments (adhesive, for example).

Figure 2:
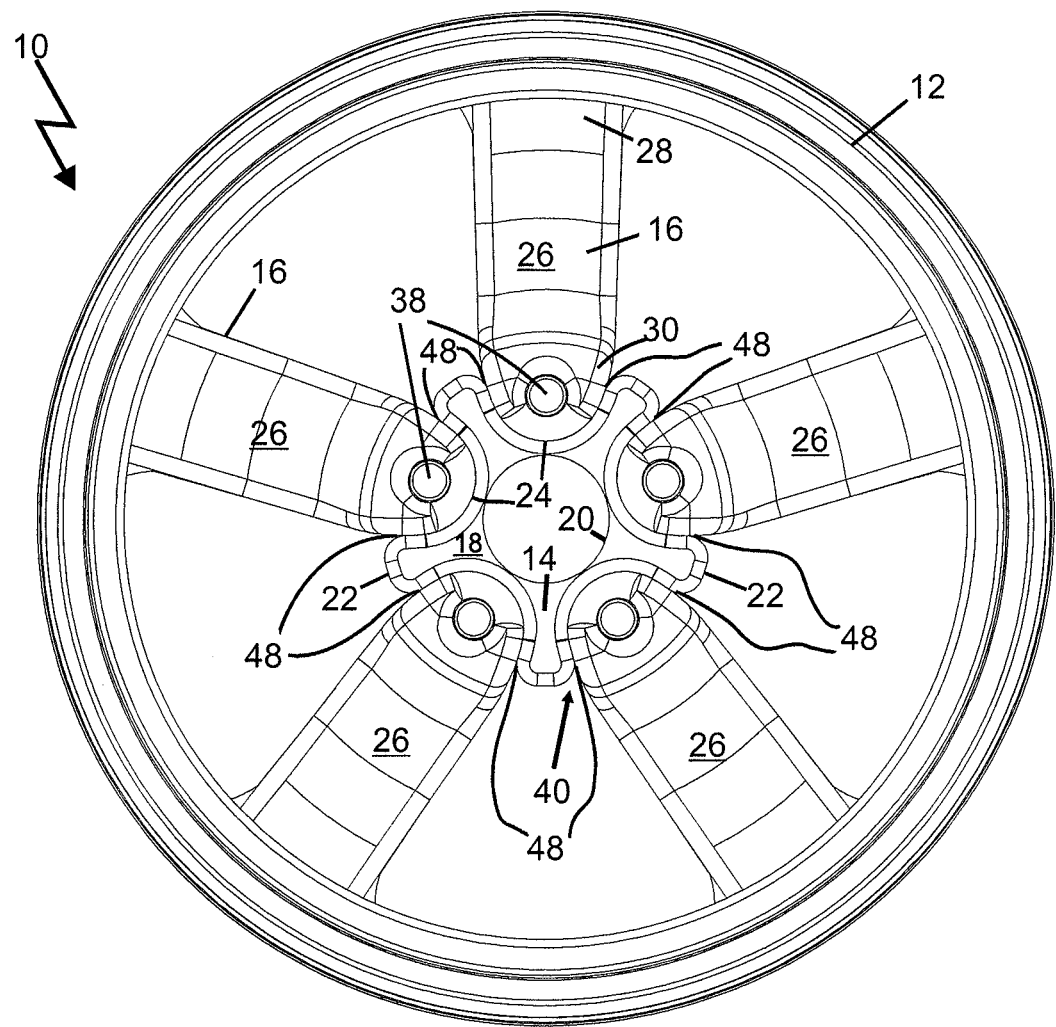
FIG. 2 is a side view of the other side of the wheel of FIG. 1.

As discussed above, each second arm end 30 also includes a fastener aperture 38 to receive a fastener. As shown in FIG. 2, when all of the structural arms 16 are attached to the center disc portion 14, the fastener apertures 38 define a bolted joint interface 40 for securement to a rotating wheel structure.

Figure 3:
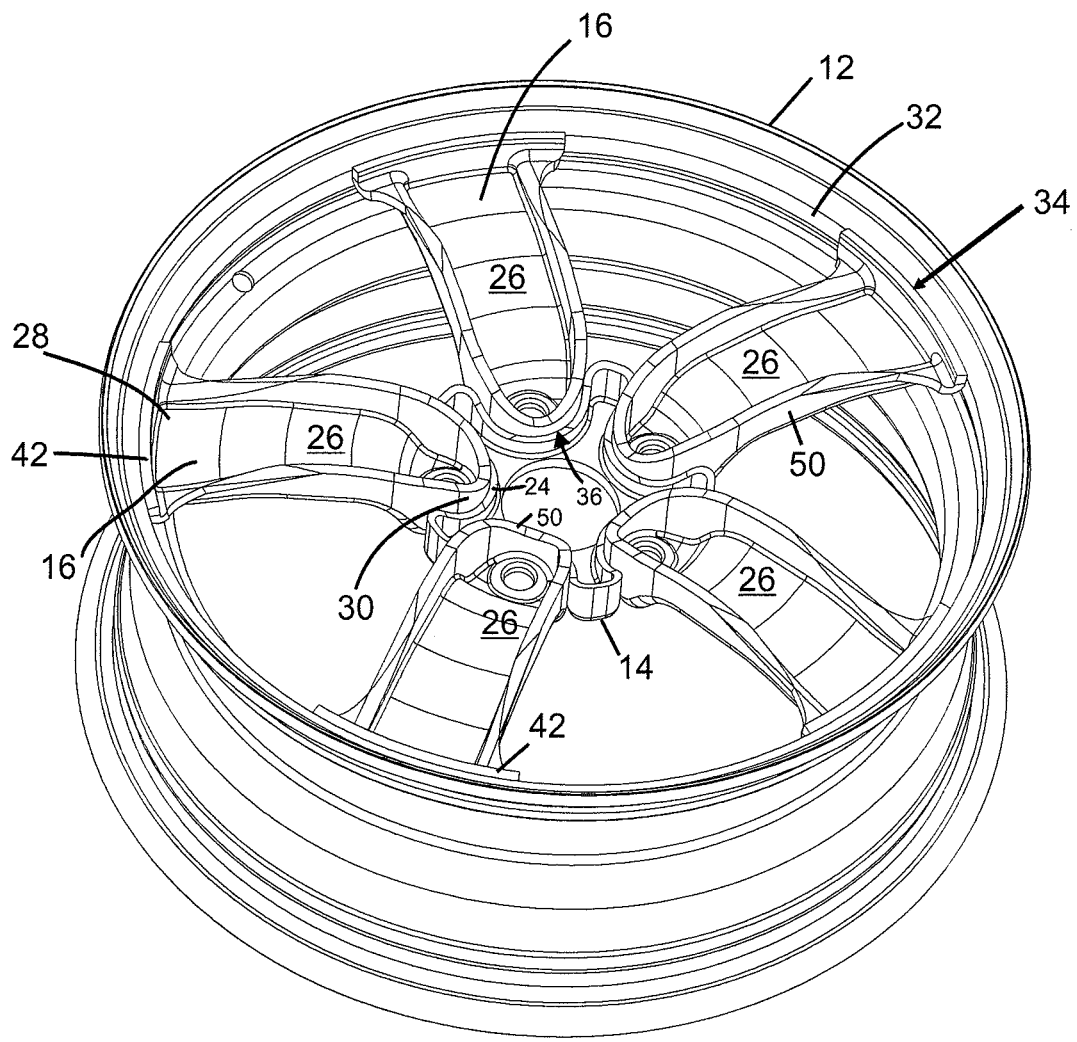
FIG. 3 is a perspective view of the wheel of FIG. 1.

A shown in FIG. 3, each structural arm 16 includes a flange portion 42 at the first arm end 28 that extends outwardly from the arm body 26 in a direction transverse to the radial direction. The flange portion 42 defines an abutment surface that contacts the inner peripheral surface 32 of the rim 12. The first weld attachment interface 34 is formed at this flange portion 42.

Each structural arm 16 also includes a flange portion 50 that extends about a periphery of the second arm end 30. The flange portion 50 extends outwardly from the arm body 26 in a direction transverse to the radial direction. In one example, the flange portion 50 is formed about a significant portion of the arm body 26 to provide increased strength. The flange portion 50 at the second arm ends 30 are received in abutting engagement with respective curved recesses 24. The second weld attachment interface 36 is formed at these flange portions 50.

Figure 4:
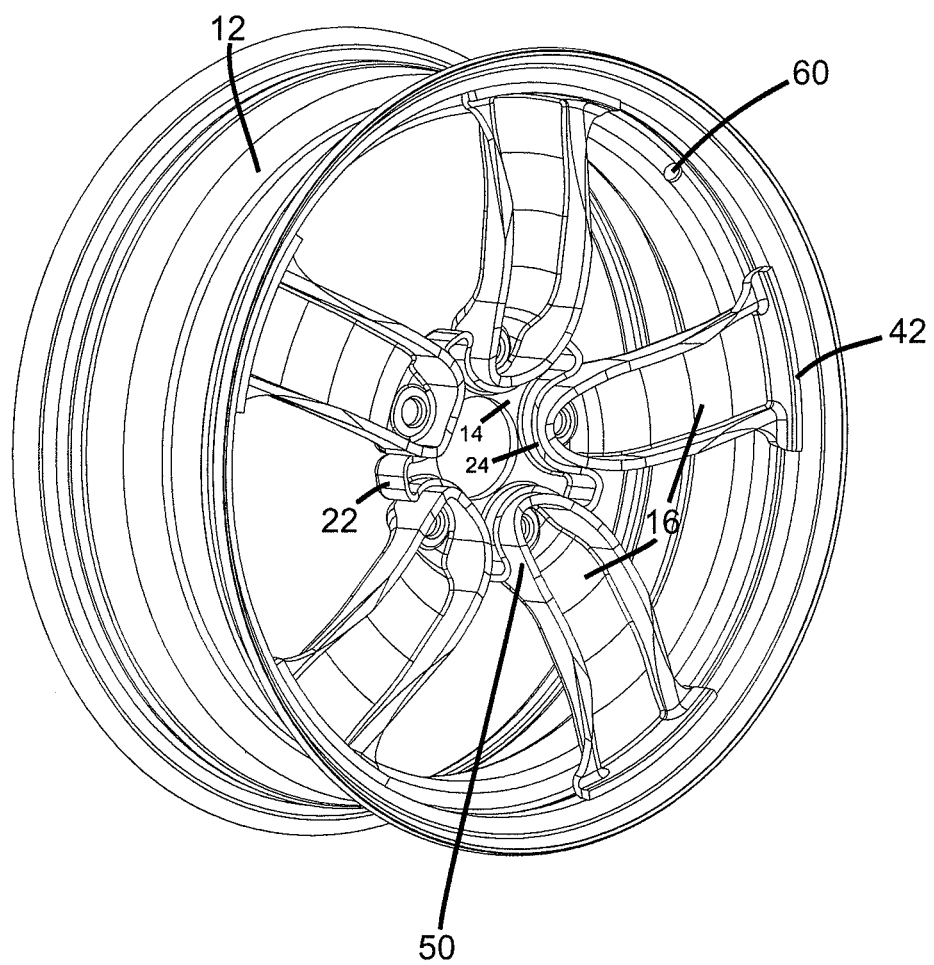
FIG. 4 is another perspective view of the wheel of FIG. 1.

As shown in FIG. 4, the second arm ends 30 are rounded such that they correspond generally in shape to the contour of the curved recesses 24. The first arm ends 28 also present a curved surface that corresponds generally in contour to the inner peripheral surface 32 of the rim 12.

Additional holes will be introduced in the arms 16 to provide a concentric position of the arms 16 in relation to the center disc portion 14 and the rim 12. The arms 16 may also include features to clamp wheel covers or different design enhancement attachments to the wheel 10. Some examples of holes 80 in the arms 16 are shown in FIGS. 11A-11C.

Figure 5:
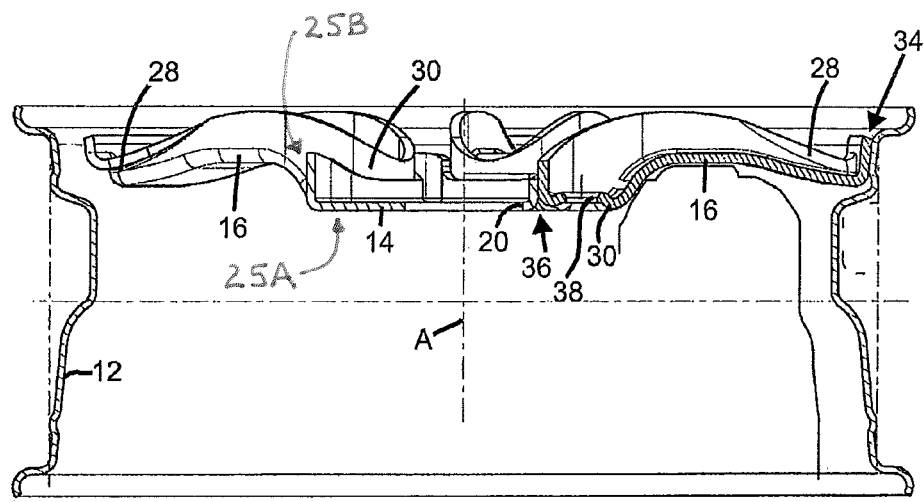
FIG. 5 is a cross-sectional view of the wheel.
Figure 6:
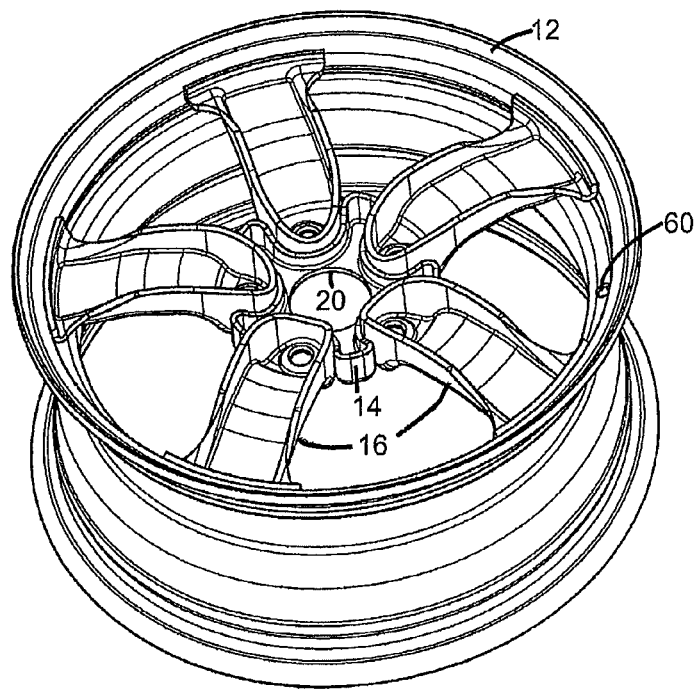
FIG. 6 is a perspective view of the wheel.
Figure 7:
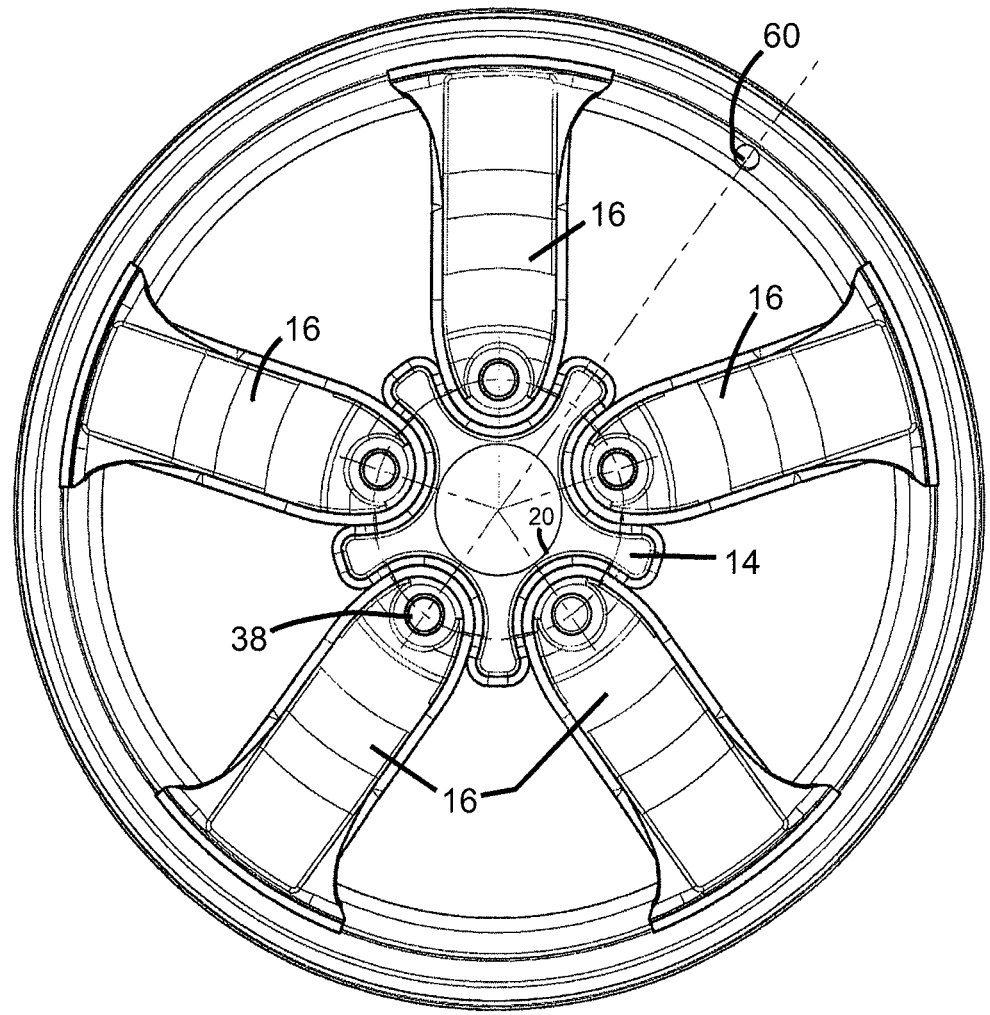
FIG. 7 is a side view of the one side of the wheel, similar to FIG. 1.

FIG. 5 shows a cross-sectional view of the rim 12, center disc portion 14, and structural arms 16. FIGS. 6 and 7 show a feature 60 that comprises a valve hole.

Figure 8A:
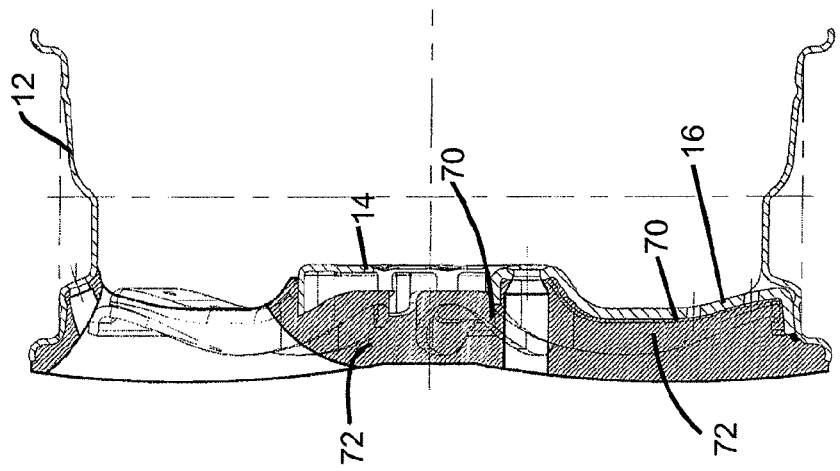
FIG. 8A is a cross-sectional view of the wheel with a plastic overmolded material.
Figure 8B:
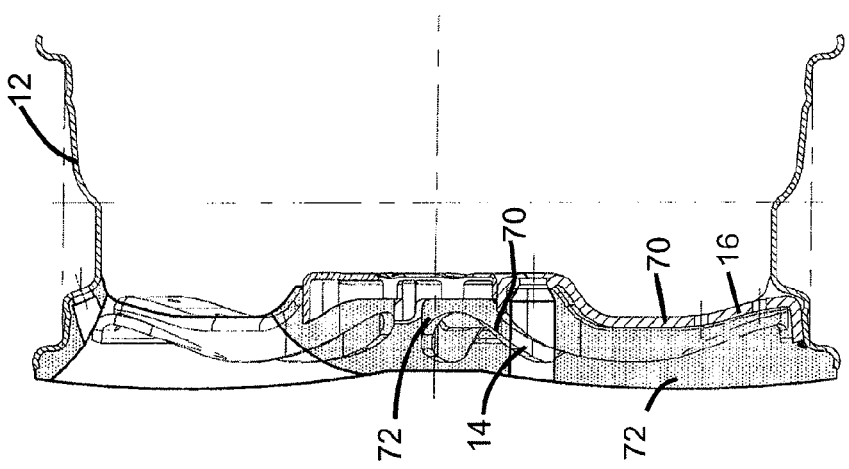
FIG. 8B is a cross-sectional view of the wheel with a composite overmolded material.

In order to provide a desired aesthetic appearance, at least a portion of the vehicle wheel 10 is overmolded with a plastic or composite material. In the example shown in FIGS. 8A-8B, outer surfaces 70 of the center disc portion 14 and structural arms 16 are covered with an overmold layer of material 72 to provide a desired appearance. It should be understood that additional surfaces of these structures could also include such a layer, or only portions of these surfaces may include a layer of material. FIG. 8A shows an example where a plastic material is used and FIG. 8B shows an example where a composite material is used.

A center portion of the wheel 10, formed by the structural arms 16 and the center disc portion 14, can be attached to the rim 12 in any of various mounting positions. FIGS. 12A-12C show examples of different mounting positions. FIG. 12A shows a bead-seat attachment 90a near an outer edge 92a of the rim 12 with a drop-well 94a immediately adjacent the arms 16.

FIG. 12B shows a bead-seat attachment 90b near the outer edge 92b with an inverted drop-well 94b that is spaced away from the arms 16. FIG. 12C shows a bead-seat attachment 90c at the drop-well 94b, i.e. FIG. 12C shows a drop-center attachment configuration.

A wheel comprised of a combination of structural arms and a center disc portion as described above provides a low cost and very robust wheel. Further, when a desired aesthetic appearance is required, this type of wheel structure in combination with overmolded plastic or composite material provides a complex wheel design that is easily provided made without adversely affecting weight or cost.

The invention claimed is:

1. A vehicle wheel comprising:
   a rim having an inner peripheral surface;
   a stamped steel center disc portion spaced radially inwardly from said inner peripheral surface, said center disc portion defining an axis and comprising a generally star-shaped body having a center aperture and a plurality of protruding portions that extend in a radial direction outwardly relative to said center aperture and which are separated from each other by curved recesses, wherein said plurality of protruding portions and said curved recesses cooperating to define a disc body portion that extends in a generally perpendicular direction relative to said axis and which terminates at a single common peripheral side wall which extends in a generally parallel direction relative to said axis, said peripheral side wall extending continuously and circumferentially about said disc body portion so as to provide said disc body portion with a continuously extending peripheral side wall and with a generally L-shape at a transition from the disc body portion to said peripheral side wall; and
   a plurality of structural arms with each structural arm having a first arm end attached to said inner peripheral surface of said rim at a first attachment interface and a second arm end received within one of said curved recesses of said body, said second arm end being generally rounded to correspond generally in shape to a contour of a respective one of said curved recesses and said second arm end being attached on an outer surface of the respective one of said curved recesses whereby said second arm end remains exposed and visible, and wherein each of said second arm ends is attached to said center disc portion at a second attachment interface.

2. The vehicle wheel according to claim 1 wherein said plurality of structural arms comprise a plurality of discrete arms that are separately attached to said center disc portion.

3. The vehicle wheel according to claim 1 wherein each structural arm includes a body portion extending in a radial direction between said rim and said center disc portion, and wherein each of said first arm ends includes a flange portion extending transversely to said radial direction to define an abutment surface that is in contact with said inner peripheral surface of said rim.

4. The vehicle wheel according to claim 1 wherein said second arm ends define a bolted joint with each of said second arm ends including a fastener aperture to receive a fastener.

5. The vehicle wheel according to claim 1 wherein at least a portion of at least one of said rim and said plurality of structural arms includes an overmolded layer of material.

6. A method of making a vehicle wheel comprising the steps of:
   (a) providing a steel rim, a stamped steel center disc portion, and a plurality of structural arms, wherein the center disc portion comprises a generally star-shaped body having a center aperture and a plurality of protruding portions that extend in a radial direction outwardly relative to the center aperture and which are separated from each other by curved recesses, wherein the plurality of protruding portions and the curved recesses cooperating to define a disc body portion that extends in a generally perpendicular direction relative to the axis and which terminates at a single common peripheral side wall which extends in a generally parallel direction relative to the axis, the peripheral side wall extending continuously and circumferentially about the disc body portion so as to provide the disc body portion with a continuously extending peripheral side wall and with a generally L-shape at a transition from the body portion to the peripheral side wall;

(b) positioning one arm end of each structural arm in one of the curved recesses of the center disc portion, wherein the one arm end is generally rounded to correspond generally in shape to a contour of a respective one of the curved recesses; and (c) joining the one arm end of each structural arm to an outer surface of the respective one of the curved recesses whereby the one arm end remains exposed and visible and joining an opposite arm end of each structural arm to an inner peripheral surface of the steel rim.

7. The method according to claim 6 including overmolding a material over at least a portion of the vehicle wheel.

8. The method according to claim 7 wherein the material comprises one of a plastic material and a composite material.

9. The method according to claim 6 wherein step (c) includes joining the one arm end to the center disc portion at least at two different locations.

10. The method according to claim 9 wherein joining comprises one of welding and employing chemical attachments.

11. The vehicle wheel according to claim 1 wherein said first and second attachment interfaces are the same attachments.

12. The vehicle wheel according to claim 11 wherein said first and second attachment interfaces are weld attachments.

13. The vehicle wheel according to claim 1 wherein a respective one of each of said plurality of protruding portions extends in a generally radially outwardly direction between each pair of adjacent said structural arms such that a number of said plurality of protruding portions is the same as a number of said plurality of structural arms.

14. The method according to claim 6 wherein step (c) includes joining the one arm end to the center disc portion by a weld attachment and joining the opposite arm end of each structural arm to the inner peripheral surface of the steel rim by a weld attachment.

15. The method according to claim 6 wherein in step (a) a respective one of each of the plurality of protruding portions extends in a generally radially outwardly direction between each pair of adjacent structural arms such that a number of the plurality of protruding portions is the same as a number of the plurality of structural arms.

16. A vehicle wheel comprising:
a rim having an inner peripheral surface;
a stamped steel center disc portion spaced radially inwardly from said inner peripheral surface, said center disc portion defining an axis and comprising a generally star-shaped body having a center aperture and a plurality of protruding portions that extend in a radial direction outwardly relative to said center aperture and which are separated from each other by curved recesses, wherein said plurality of protruding portions and said curved recesses cooperating to define a disc body portion that extends in a generally perpendicular direction relative to said axis and which terminates at a single common peripheral side wall which extends in a generally parallel direction relative to said axis, said peripheral side wall extending continuously and circumferentially about said disc body portion so as to provide said disc body portion with a continuously extending peripheral side wall and with a generally L-shape at a transition from the body portion to the peripheral side wall; and a plurality of structural arms with each structural arm having a first arm end attached to said inner peripheral surface of said rim at a first attachment interface and a second arm end received within one of said curved recesses of said body, said second arm end being generally rounded to correspond generally in shape to a contour of a respective one of said curved recesses and said second arm end being attached on an outer surface of the respective one of said curved recesses whereby said second arm end remains exposed and visible, and wherein each of said second arm ends is attached to said center disc portion at a second attachment interface;

wherein a respective one of each of said plurality of protruding portions extends between each pair of adjacent said structural arms such that a number of said plurality of protruding portions is the same as a number of said plurality of structural arms.

17. The vehicle wheel according to claim 16 wherein said plurality of structural arms comprise a plurality of discrete arms that are separately attached to said center disc portion.

18. The vehicle wheel according to claim 16 wherein each structural arm includes a body portion extending in a radial direction between said rim and said center disc portion, and wherein each of said first arm ends includes a flange portion extending transversely to said radial direction to define an abutment surface that is in contact with said inner peripheral surface of said rim.

19. The vehicle wheel according to claim 16 wherein said second arm ends define a bolted joint with each of said second arm ends including a fastener aperture to receive a fastener.

20. The vehicle wheel according to claim 16 wherein at least a portion of at least one of said rim and said plurality of structural arms includes an overmolded layer of material.

* * * * *